United States Patent [19]

Hirko et al.

[11] 4,233,281

[45] Nov. 11, 1980

[54] RECOVERY OF HYDROGEN FLUORIDE FROM METALLIC FLUORIDE SALTS

[75] Inventors: Ronald J. Hirko; Harold E. Mills, both of Lake City, Fla.

[73] Assignee: Occidental Chemical Company, Houston, Tex.

[21] Appl. No.: 914,130

[22] Filed: Jun. 9, 1978

[51] Int. Cl.$^2$ ............................................. C01B 7/19
[52] U.S. Cl. ...................... 423/484; 203/12; 203/74; 203/76; 423/488
[58] Field of Search ............... 423/320, 483, 484, 485, 423/488; 203/35, 96, 12, 74, 76

[56] References Cited

U.S. PATENT DOCUMENTS

| | | | |
|---|---|---|---|
| 2,753,253 | 7/1956 | Hollingsworth | 423/484 |
| 2,759,795 | 8/1956 | Archer | 423/320 |
| 3,091,513 | 5/1963 | Parish | 423/483 |
| 3,167,391 | 1/1965 | Swinehart | 423/485 |
| 3,257,167 | 6/1966 | Mohr et al. | 423/483 |
| 3,615,195 | 10/1971 | Bierman | 423/320 |
| 3,825,655 | 7/1974 | Eipeltaner et al. | 423/483 |
| 3,935,298 | 1/1976 | Sugahara et al. | 423/320 |

OTHER PUBLICATIONS

Lecassie et al. "Sulfuric Acid Extractive Distillation Process for Recovery of Anhydrous Hydrofluoric Acid from By-Product Aqueous Hydrofluoric Acid" A.E.C., Technical Information Service NY02048, Declassified 1955.

Primary Examiner—Brian E. Hearn
Attorney, Agent, or Firm—Barry A. Bisson

[57] ABSTRACT

Anhydrous hydrogen fluoride of high purity can be recovered from metallic fluoride salts containing phosphate values by digesting the metallic salts in an aqueous solution in a humid atmosphere at a sufficiently high temperature to release a gas containing hydrogen fluoride and negligible amount of $P_2O_5$. The released gas is rectified in a rectification operation which includes a rectification zone in which the rectification occurs in the presence of sulfuric acid.

54 Claims, 4 Drawing Figures

PREDICTED DATA AT CF=85

RECOVERY OF HYDROGEN FLUORIDE FROM METALLIC FLUORIDE SALTS

BACKGROUND

This invention relates to the recovery of anhydrous hydrogen fluoride from metallic fluoride salts which contain substantial amounts of phosphate values. Such metallic fluoride salts include fluoride containing material precipitated from a waste stream from a wet-process phosphoric acid facility such as pond water. For example, sediment obtained from the floor in gypsum cooling ponds can contain up to 25% fluoride. Similarly, fluoride containing solids can be precipitated from gypsum cooling pond water or waste water by controlling neutralization with limestone and/or lime. These precipitates are contaminated with phosphate and metallic materials.

Conventional reaction of metallic fluoride solids with concentrated sulfuric acid in a low humidity atmosphere to release volatile fluoride values also causes liberation of volatile fluorophosphates. The evolved fluorophosphates rapidly hydrolyze to yield compounds such as $HPO_2F_2$ and $H_2PO_3F$, which ultimately reduce to HF and $H_3PO_4$. The production of hydrogen fluoride with phosphate values is unsatisfactory because commercial anhydrous hydrogen fluoride requires a HF to $P_2O_5$ ratio of greater than 10,000:1.

Therefore, there is a need for a process for producing a nearly phosphate free anhydrous hydrofluoric acid from phosphate-contaminated metallic fluoride salts contained in material such as solids precipitated from cooling pond waters and fluoride containing sludges resulting from phosphate production operations.

SUMMARY

There is provided by this invention such a process. According to this process, hydrogen fluoride substantially free of phosphate valves is recovered from metallic fluoride salts comprising metallic cations reactive with sulfuric acid, at least 7% by weight on a dry basis fluorine, and from about 4% to about 25% by weight on a dry basis $P_2O_5$. The process comprises the steps of introducing such metallic fluoride salts to a digestion zone, and introducing to the digestion zone water and/or steam, and sulfuric acid. The digestion zone is maintained at an elevated temperature sufficiently high to release a gas comprising hydrogen fluoride, water, and $P_2O_5$ values from the metallic fluoride salts. A slurry comprising a residual liquid including introduced water, introduced sulfuric acid, and phosphoric acid generated by the action of sulfuric acid on metallic phosphate salts, and residual solids resulting from the metallic fluoride salts, is formed in the digestion zone. The slurry and the released gas are withdrawn from the digestion zone.

Sufficient water and sufficient sulfuric acid are introduced into the digestion zone such that Ci is from about 20 to about 70, R is from about 1 to 15, and Cf is from about 25 to 90, where:

- Ci = the amount of sulfuric acid and phosphoric acid theoretically present in the digestion zone after introduction of the sulfuric acid and water to the digestion zone in excess of the amount of sulfuric acid required for reaction with reactive metal cations in the digestion zone, Ci being expressed in units of percent by weight in the liquid phase;
- R = Ci/HFi, where HFi is the theoretical concentration of hydrogen fluoride in the liquid in the digestion zone after introduction of the sulfuric acid and water to the digestion zone in units of percent by weight in the liquid in the digestion zone; and
- Cf = the actual concentration of the sulfuric acid and phosphoric acid in the residual liquid in units of percent by weight in the residual liquid.

By operating the digestion zone at these values for R, Ci and Cf, the gas withdrawn from the digestion zone has a weight ratio of hydrogen fluoride to $P_2O_5$ of at least 100:1.

Preferably the concentrations of water and sulfuric acid in the digestion zone are maintained such that at least 60% of the fluorine in the metallic fluoride salts introduced to the digestion zone are in the released gas withdrawn from the digestion zone, the released gas comprises at least 10% by weight of hydrogen fluoride, and the slurry withdrawn from the digestion zone has a solids content sufficiently low that it is pumpable.

To produce anhydrous hydrogen fluoride from the released gas and further increase the hydrogen fluoride to $P_2O_5$ ratio of the released gas, the released gas is rectified. The rectification can occur in a rectification operation comprising at least two rectification zones in series, where in at least one rectification zone, the rectification occurs in the presence of sulfuric acid. For example the released gas can be introduced to a first rectification zone to produce a substantially azeotropic mixture of water and hydrogen fluoride. Then the azeotropic mixture is introduced to a second rectification zone to produce a vapor stream enriched with hydrogen fluoride. Sufficient sulfuric acid is introduced to the second rectification zone such that the vapor stream withdrawn from the second rectification zone comprises at least 80% HF by weight and has a hydrogen fluoride to $P_2O_5$ weight ratio of greater than 10,000:1. This can be effected by adding sufficient sulfuric acid to the second rectification zone, to yield in combination with the azeotropic mixture introduced to the second rectification zone, a solution comprising from about 40 to about 90% by weight sulfuric acid on a hydrogen fluoride free basis. Steam can be introduced to the second rectification zone to enhance yield of hydrogen fluoride.

DRAWINGS

These and other features, aspects and advantages of the present invention will become more apparent upon consideration of the following description, appended claims, and accompanying drawings where:

Figure 3:
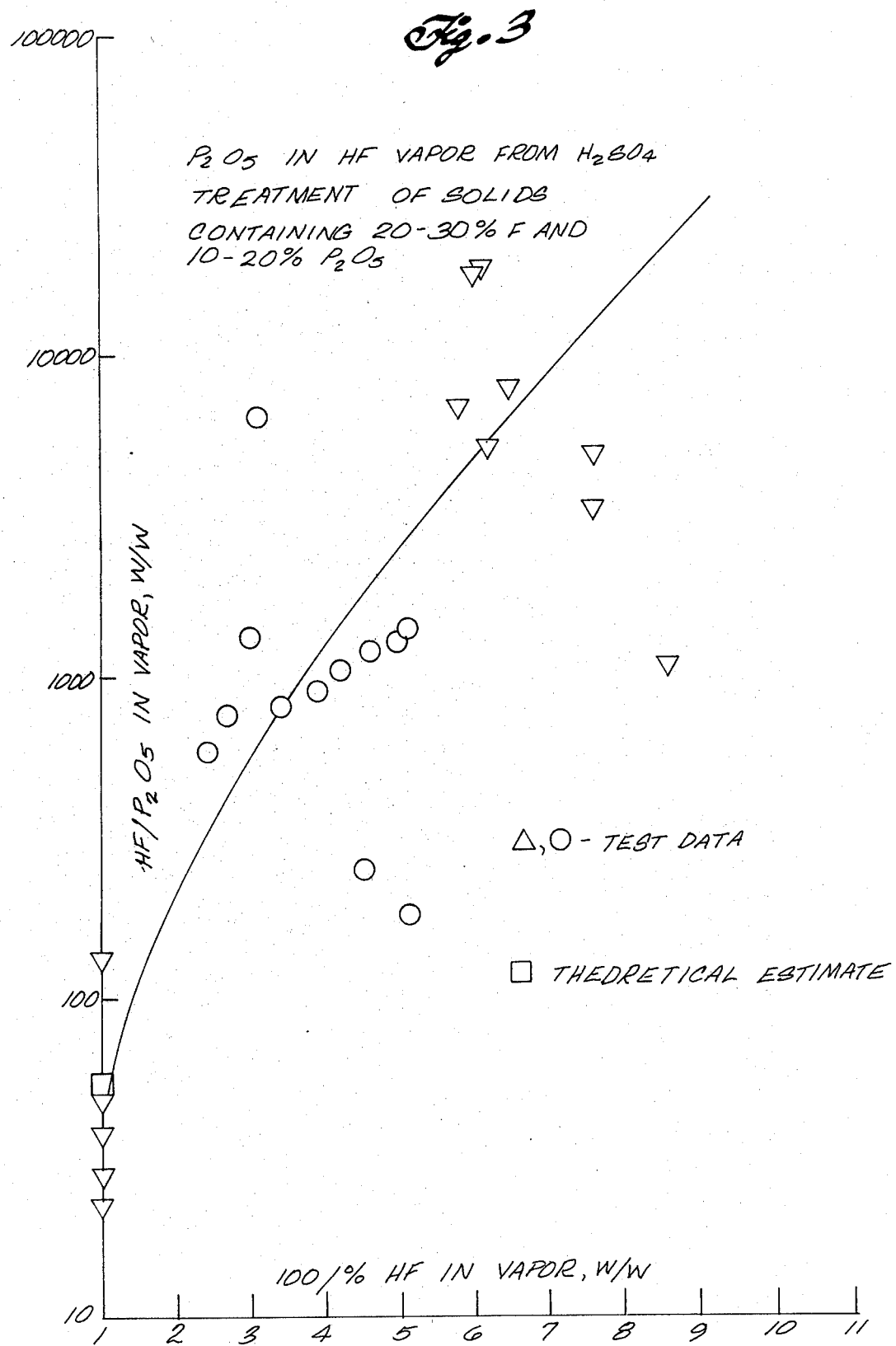
Figure 4:
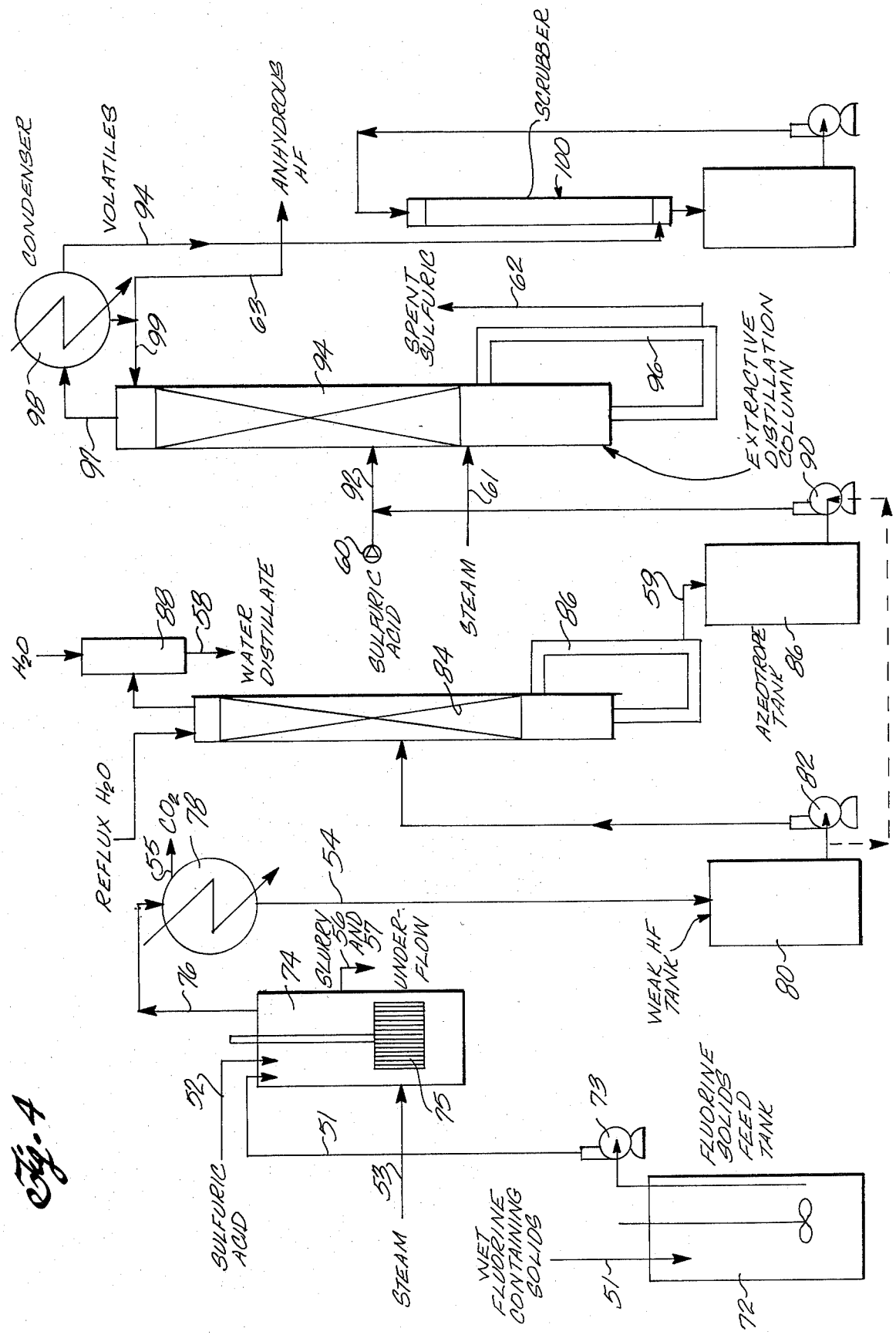

FIG. 3 presents graphically the relationship between the hydrogen fluoride to $P_2O_5$ mass ratio and percent hydrogen fluoride in the vapor removed from a digestion zone operated in accordance with principles of this invention; and FIG. 4 schematically shows test apparatus used to demonstrate this invention.

DESCRIPTION

Figure 1:
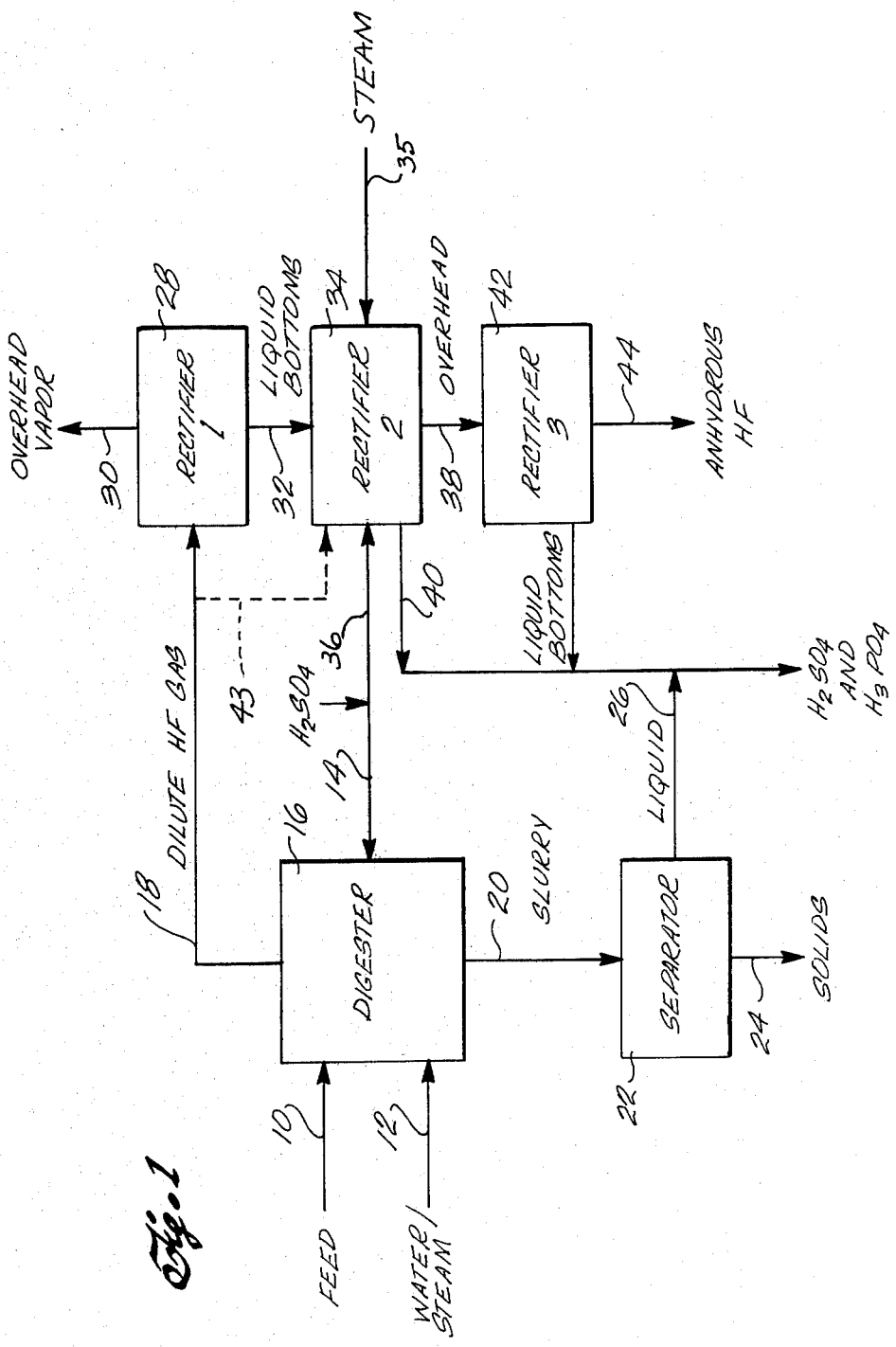
FIG. 1 is a flow sheet showing a process embodying features of this invention.

In general, with reference to FIG. 1, metallic fluoride salts 10, water and/or steam 12, and sulfuric acid 14, are introduced to a digestion zone 16. The reaction between the sulfuric acid and the metallic fluoride salts releases a gas 18 containing hydrogen fluoride at a dilute concentration and produces a slurry 20 consisting of a residual liquid which includes introduced water and introduced sulfuric acid and a solids residual resulting from the metallic fluoride salts, typically predominately calcium sulfate. The slurry 20 is passed to a separator 22 to separate the residual solids 24 from the residual liquids 26.

The dilute hydrogen fluoride containing gas is concentrated to produce anhydrous hydrogen fluoride by rectification. This can be effected in two or more rectification zones in series. The dilute fluoride containing vapors 18 are passed to a first rectification zone 28 from which liquid bottoms 32 and overhead vapors 30 comprising substantially water are withdrawn. The liquid bottoms comprise a substantially azeotropic mixture of water and hydrogen fluoride, and also contain phosphate values. The azeotropic mixture is then introduced into a second rectification zone 34 along with sufficient sulfuric acid 36 such that an overhead vapor stream 38 withdrawn from the second rectification zone 34 comprises at least 80% hydrogen fluoride by volume. Preferably steam is introduced from line 35 to the second rectification zone 34 to enhance hydrogen fluoride yield. Liquid bottoms 40 from the second rectification zone can be combined with the liquid 26 from the separator 22 for disposal. If necessary, the vapor stream 38 from the second rectification zone 34 can be further rectified in a third rectification zone 42 to produce anhydrous hydrogen fluoride.

If the hydrogen fluoride content of the dilute fluoride containing vapors 18 from the digester 16 is sufficiently high, i.e., greater than about 20% by weight, then the first rectifier 28 can be bypassed as shown by dashed line 43 in FIG. 1.

The metallic fluoride salts introduced to the digestion zone 16 comprise metallic cations reactive with sulfuric acid such as $Ca^{++}$, $Al^{+++}$, $Fe^{+++}$, $Mg^{++}$, and the like; at least about 7% by weight on a dry basis fluorine; and from about 4% to about 25% by weight on a dry basis $P_2O_5$. If the salts contain less than about 7% by weight fluorine, it can be uneconomical to process them. If the salts contain more than about 25% by weight phosphate values it is very difficult to effect an efficient separation of HF from the phosphate values.

It should be realized that the phosphate values present in the metallic fluoride salts usually are not present as "$P_2O_5$", but typically are present as $PO_4^{---}$ and complexed with fluorine as fluorophospates. However, standard tests used for analysis of phosphate values yield results in terms of $P_2O_5$. Therefore, it should be realized, that when the $P_2O_5$ content of a material is referred to in this specification and the accompanying claims, only an indirect measure of the phosphorus content of the material is being presented. Likewise, analysis for calcium, aluminum, iron, magnesium, silicon, sodium, manganese, and sulfur yield results in terms of $CaO$, $Al_2O_3$, $Fe_2O_3$, $MgO$, $SiO_2$, $Na_2O$, $MnO$, and $SO_4$, respectively.

The metallic fluoride salts introduced to the digestion zone can be wet or dry. Typically they are introduced to the digestion zone wet, or even as a concentrated slurry, because there is little to be gained by undergoing the expense to dry the solids because water is introduced to the digestion zone. This is an advantage over prior art processes for producing hydrogen fluoride from metallic fluoride salts where it is necessary that the feed be substantially dry because digestion is conducted in a low humidity atmosphere.

The metallic fluoride salts introduced to the digestion zone can be solid waste obtained from cooling pond waters and/or fluoride containing sludges resulting from phosphate production operations. A preferred method for recovering metallic fluoride salts from phosphate operation waste water is described in U.S. patent application Ser. No. 863,085, filed on Dec. 22, 1977, entitled "Recovery of Calcium Fluoride from Phosphate Operation Waste Water". This application is incorporated herein by this reference.

The sulfuric acid and water added to the digestion zone can be added separately, or together, as an aqueous solution of sulfuric acid. Steam can be added to the digester 16 as part of or instead of the water added to the digester. The steam is added to provide energy required for vaporization of water and hydrogen fluoride in the digester. A portion of the energy required for vaporization is provided by the exothermic reactions occurring in the digester. In addition to or instead of steam, other heating means can be used such as circulating a portion of the liquid in the digester through a heat exchanger, steam jacketing of the digester, or electric heating elements around the digester. The digester is maintained at an elevated temperature at or near the boiling of the liquid in the digester.

In the digester, the sulfuric acid reacts with the metallic fluoride salts to yield hydrofluoric acid and the corresponding metal sulfate. For example, in the case of metallic fluoride salts containing calcium fluoride, the following reaction occurs:

$$CaF_2 + H_2SO_4 \xrightarrow{H_2O} CaSO_4 \downarrow + 2HF \uparrow . \qquad (1)$$

In addition, phosphoric acid is generated in the digester due to the action of sulfuric acid on metallic phosphate salts which are present in the digester.

By proper selection of the amount of sulfuric acid and water introduced to the digestion zone, the distillate 18 withdrawn from the digester can be maintained substantially free of $P_2O_5$, i.e., the fluorine to $P_2O_5$ mass ratio can be maintained greater than 100:1. Preferably the F to $P_2O_5$ mass ratio is maintained greater than 1000:1 in the distillate. This is unlike prior armethods where, when metallic fluoride salts containing phosphate values are digested in a low humidity atmosphere, liberation of substantial quantities of fluorophosphates results.

In order to have an economically viable process, the yield obtained in the digester, the solids content of the slurry 20, and the concentration of hydrogen fluoride in the distillate 18 require careful control. Table I shows preferred and broad ranges for process variable and parameters of the digestion zone.

As shown in Table I, the percent by weight of the fluorine in the metallic fluoride salts introduced to the digestion zone which are recovered in the distillate withdrawn from the digestion zone, Y is at least 60%, and more preferably at least 80%.

TABLE I

| RANGES FOR PROCESS VARIABLES and PARAMETERS | | | |
|---|---|---|---|
| VARIABLE/ PARAMETER | UNITS | BROAD RANGE | PREFERRED RANGE |
| HF:$P_2O_5$ | — | ≧100:1 | ≧1000:1 |
| US | % | Pumpable slurry | |

TABLE I-continued

RANGES FOR PROCESS VARIABLES and PARAMETERS

| VARIABLE/ PARAMETER | UNITS | BROAD RANGE | PREFERRED RANGE |
|---|---|---|---|
| | by weight % | (<50) ≧60 | <45 >80 |
| Y | by weight % | | |
| $HF_v$ | by weight % | >10 | >20 |
| R | by value — | 1–15 | 6–10 |
| Ci | % by weight | 20–70 | 40–55 |
| Cf | % by weight | 25–90 | 75–85 |

It is necessary that the solids content of the slurry withdrawn from the digester, US, be sufficiently low that the slurry, which is thixotropic, be pumpable by conventional pumping equipment. Thus, it is necessary that US be less than about 50, and preferably less than about 45 for ease in pumping.

A high concentration of hydrogen fluoride in the distillate, $HF_v$, is desired, because less energy is required to rectify the distillate to produce anhydrous hydrogen fluoride by vaporization of the water in the distillate. Therefore, it is preferred that $HF_v$ be greater than about 10% by weight, and more preferably greater than about 20% by weight.

A mathematical model has been developed to relate the amount of water and sulfuric acid introduced to the digestion zone to US, Y, and $HF_v$. This model was developed using equilibrium data regarding the system $HF$—$H_2SO_4$—$H_2O$ presented in the report *Sulfuric Acid Extractive Distillation Process for the Recovery of Anhydrous Hydrofluoric Acid from By-Product Aqueous Hydrofluoric Acid*, R. W. LeGassie and J. P. Termini, NYO-204A, 1954. Using this equilibrium data and a mass balance around the digestion zone, assuming equilibrium is achieved in the digestion zone, the mathematical model was developed. According to this model, the quantity of water and sulfuric acid introduced to the digestion zone are selected to substantially satisfy the equations:

$$HF_v = \frac{KCi}{((K-1)J+1)R} \geq 10\% \quad (2)$$

$$Y = \frac{100JK}{(K-1)J+1} \geq 60\% \quad (3)$$

and $$US = \frac{1}{\frac{RW}{Cf} + \frac{1}{100}} \leq 50\% \quad (4)$$

where $$J = 1 - (Ci/Cf) \quad (5)$$

$HF_v$ = the concentration of HF in the released gas withdrawn from the digestion zone in % by weight;
Y = the percent by weight of the fluorine in the metallic fluoride salts introduced to the digestion zone which are recovered in the released gas withdrawn from the digestion zone, i.e. yield of HF;
US = the solids contents of the slurry, % by weight;
K = 0.095565e (0.075435Cf);
W = with respect to the metallic fluoride salts introduced to the digestion zone, the mass ratio of fluorine represented as HF to calcium oxide represented as $CaSO_4$;
Ci = the amount of sulfuric acid and phosphoric acid theoretically present in the digestion zone after introduction of the sulfuric acid and water to the digestion zone in excess of the amount of sulfuric acid required for reaction with the reactive metallic cations in the digestion zone, where Ci is in units of percent by weight in the liquid phase;
R = Ci/HFi;
HFi = the theoretical concentration of hydrogen fluoride in the liquid in the digestion zone after introduction of the sulfuric acid and water to the digestion zone in units of percent by weight in the liquid in the digestion zone; and
Cf = the actual concentration of hydrogen fluoride and sulfuric acid and phosphoric acid in the residual liquid in units of percent by weight in the residual liquid.

As demonstrated by examples presented herein, this model has been experimentally verified.

To achieve the desired values for $HF_v$, Y, and US, it is necessary that R be between about 1 and 15, Ci be between about 20 and about 70, and Cf be between about 25 to about 90. To achieve the preferred values for US, Y and $HF_v$, it is necessary that R be from about 6 to about 10, Ci be from about 40 to about 55, and Cf be from about 75 to about 85. This is summarized in Table I.

Figure 2:
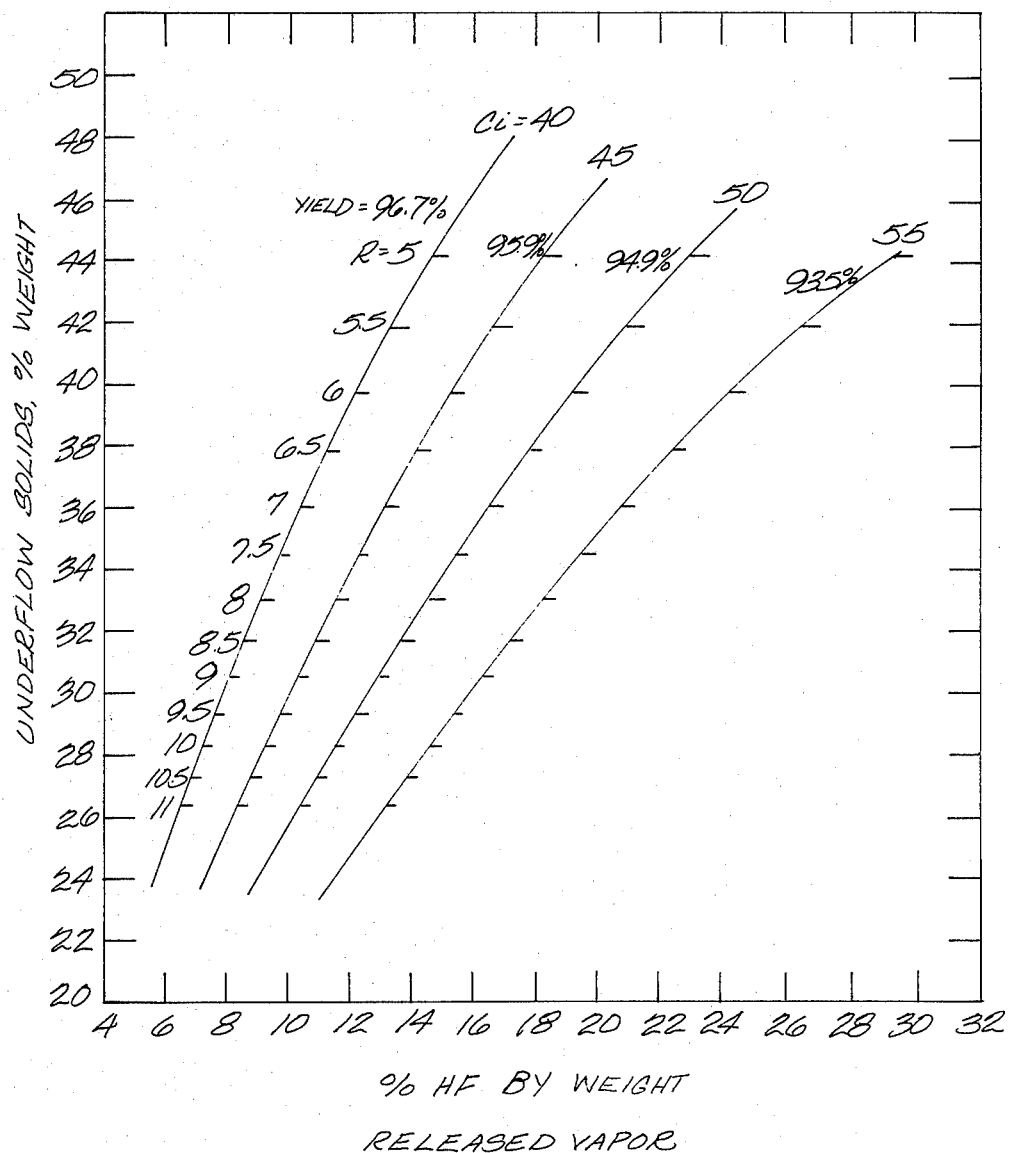
FIG. 2 illustrates graphically the predicted relationship between process parameters and process variables in a digestion zone operated in accordance with principles of the present invention.

FIG. 2 shows the effect of changes on R and Ci by changes in US, $HF_v$, and Y, assuming Cf=85. Analysis of equations 2–4, and FIG. 2, as well as experimental data has led to an understanding of the relationship between the process variables R, Ci and Cf and the process parameters US, Y, $HF_v$, and the ratio of hydrogen fluoride to $P_2O_5$ in the distillate. These relationships are summarized in Table II.

Table II assumes than only one of the three process variables is being changed while the other two are maintained constant, although in practice this is very difficult to achieve since each variable depends on the amount of sulfuric acid and water added to the digestion zone.

TABLE II

EFFECT OF PROCESS VARIABLES ON PROCESS PARAMETERS

| CHANGE IN VARIABLE | | CHANGE IN PARAMETER | | |
|---|---|---|---|---|
| | | US | Y | $HF_V$ | $HF/P_2O_5$ |
| R | UP | DOWN | NC | DOWN | UP |
| | DOWN | UP | NC | UP | DOWN |
| Ci | UP | NC | DOWN | UP | DOWN |
| | DOWN | NC | UP | DOWN | UP |
| Cf | UP | UP | UP (small effect) | UP | UP |
| | DOWN | DOWN | DOWN (small effect) | DOWN | DOWN |

NC = Substantially No Change

As shown in Table II, the change in each of the process variables has a beneficial and adverse effect on the process parameters. For example, increasing R decreases US and increases the HF to $P_2O_5$ ratio, both of which are beneficial results, but has the adverse effect of decreasing $HF_v$. Likewise, decreasing Ci has the beneficial effects of increasing Y and the HF to $P_2O_5$ ratio, but has the adverse effect of decreasing $HF_v$. Therefore, in order to maintain US, Y, $HF_v$, and the hydrogen fluoride to phosphate ratios in the desired ranges, it is necessary to maintain R, Ci and Cf in the ranges presented in Table I.

The ratio of HF to $P_2O_5$ appears to depend on the concentration of HF in the distillate. FIG. 3 presents the experimentally determined correlation between HF and $P_2O_5$ in the digester distillate. As shown in FIG. 3, the HF to $P_2O_5$ ratio in the distillate increases as the hydrogen fluoride content of the distillate decreases. It is hypothesized that this correlation indicates that the distillate phosphate content is at least partially a result of entrainment. A typical distillate represents about a 3,000 fold refinement in the HF to $P_2O_5$ ratio present in the digestion zone.

Preferably the contents of the digester are maintained under agitation to assure that the reaction mass in the digester achieves equilibrium conditions. The digester can be operated under either batch conditions or continuously.

The digestion is conducted at an absolute pressure ranging from about 90 mm Hg to atmospheric so that Cf can be maintained from about 25 to about 90. It has been found that reducing the pressure in the digester below atmospheric does not appear to affect either the yield from the process or the distillate composition. However, digester operation under vacuum decreases the operational temperature required, without affecting the equilibrium properties of the system.

The slurry 20 withdrawn from the digester comprises a residual liquid and residual solids. The residual liquid includes introduced water, introduced sulfuric acid, phosphoric acid, and some hydrofluoric acid. The residual solids comprise non-reactive components of the feed material 10, and metallic sulfate salts such as calcium sulfate and magnesium sulfate. The solids are separated from the liquid in the separator 22 which can be conventional separation means such as drum filters, settling basins, and the like.

The distillate 18 withdrawn from the digester 16 comprises phosphate values, from about 10 to up to 35% by volume hydrogen fluoride, with the remainder comprising substantially water. The hydrogen fluoride to phosphate mass ratio is greater than about 100:1 and is preferably greater than 1000:1.

The distillate is subjected to rectification to produce anhydrous hydrogen fluoride having a hydrogen fluoride to phosphate weight ratio of greater than 10,000:1. This can be effected by introducing the hydrogen fluoride containing distillate to the first rectifier 28, in which the distillate is concentrated to about 35 to about 39% by weight hydrogen fluoride at an absolute pressure of 90 mm Hg to atmospheric, with water and carbon dioxide being removed in the overhead vapor 30. The liquid bottoms 32 from the first rectifier are substantially an azeotropic mixture of water and hydrogen fluoride.

If the distillate has a relatively high hydrogen fluoride concentration, generally greater than about 20% by weight, the first rectifier 28 can be bypassed and the distillate can be directly introduced to the second rectifier 34 via line 43.

The azeotropic mixture is passed to the second rectifier 34. Sufficient sulfuric acid is introduced to the second rectifier so that the overhead 38 from the second rectifier has a hydrogen fluoride concentration of at least 80% by volume, and preferably is substantially anhydrous. This can be effected by introducing to the second rectifier sufficient sulfuric acid to yield a solution comprising from about 40 to about 90% by weight sulfuric acid on a hydrogen fluoride free basis.

It has been found that introduction of steam to the second rectifier enhances hydrogen fluoride yield. Therefore, preferably steam is introduced via line 35 to the second rectifier.

The liquid bottoms 40 from the second rectifier 34 contain sulfuric acid, phosphoric acid, and water. The bottoms can be combined with the liquid stream 26 from the separator 22 and passed to disposal.

The overhead 38 from the second rectifier has a hydrogen fluoride to $P_2O_5$ weight ratio of greater than 10,000:1. If it is necessary to remove additional water from the overhead 38, it can be passed to the third rectification zone 42.

All concentrations and ratios presented herein, including in the description of the invention, examples, and claims, are in percent by weight, unless indicated otherwise.

These and other features, aspects and advantages of the present invention can be better understood with reference to the following examples:

EXAMPLES 1–23.

Metallic fluoride salts were precipitated from cooling pond waters resulting from phosphate production operations in accordance with the method described in the above-identified U.S. patent application Ser. No. 863,085 filed on Dec. 22, 1977. With reference to Table III, column A presents the analysis of the precipitate used for Examples 1–13, and Column B presents the analysis of the precipitate used for Examples 14–23.

TABLE III

| FEED ANALYSIS, % BY WEIGHT | | |
|---|---|---|
| Component | A | B |
| F | 24.54 | 23.25 |
| $P_2O_5$ | 14.16 | 13.99 |
| $CO_2$ | 3.84 | 3.78 |
| CaO | 54.01 | 53.07 |
| $Al_2O_3$ | 2.03 | 1.98 |
| $Fe_2O_3$ | 1.01 | 0.97 |
| MgO | 0.58 | 0.55 |
| $SiO_2$ | 2.59 | 2.35 |
| $Na_2O$ | 0.44 | 0.98 |
| MnO | 0.04 | — |
| $SO_4$ | 2.66 | 2.74 |

These tests were conducted in a batch digestion system comprising a 500 ml Teflon boiling flask connected to an ice water condenser via Teflon tubing. Monel tubing comprised the inner portion of the condenser. For experiments conducted at reduced pressure, the system was modified to include a series of traps in order to avoid damage to the vacuum pump used. The desired vacuum was maintained by an air bleed and was monitored in a distillate receiver flask. The digester temperature was observed using an iron-constantan thermocouple inserted in a closed-end monel tube. Agitation of the reactor contents was supplied by a magnetic stirrer and a Teflon clad stir bar.

A batch digestion test was initiated by charging the Teflon flask with a weighted portion of the dry feed material followed by the desired amount of water. This mixture was agitated for about thirty minutes to ensure complete wetting of the solid. The desired amount of standardized sulfuric acid, containing approximately 96% $H_2SO_4$, was added to the digester from a Teflon separatory funnel attached directly to the system to eliminate fluoride vapor losses. Upon mixing, the temperature normally increased from room temperature to about 120° to 130° C. Heat was applied to the Teflon flask via a variable heating jacket. In the case of reduced pressure operation, the digester was air cooled to about 70° C. after which the vacuum and heat were applied. The heating rate was carefully controlled to eliminate digester priming by the liberated $CO_2$.

The termination of the digestion period was estimated from a predetermined temperature—liquid composition curve. After a cooling period the mass of the digester contents was determined, and the contents of the digester were vacuum filtered. The sulfuric acid filtrate was recovered for analysis. The filter cake was washed repeatedly with water until a clear filtrate was obtained. The cake was subsequently oven dried at 105° C. overnight and weighed.

The fluoride contents of the feed solids, distillate, and bottoms residue (liquid and solids separately) were analyzed with a fluoride electrode using as a buffer medium TISAB, which is available from Orion Research Incorporated of Cambridge, Massachusetts. The solids were initially fused with potassium carbonate followed by dissolution in water. The liquid samples were water diluted. One part of diluted sample (1 to 100 ppm F) was combined with nine parts TISAB prior to fluoride electrode analysis.

The experimental fluoride yield was determined from the quantity of fluoride not evolved from the digester. This was determined from the masses and fluoride contents of the liquid and solid residue phases. The liquid mass was determined from the total residual mass less that of the washed and dried solids. Based on the initial system mass (less the volatile $CO_2$), the final mass and the respective fluoride contents, the quantity of the distillate and fluoride content of the distillate were calculated. The yield calculated in this manner agreed well with the yield based on the actual distillate collected. However, since it was difficult to avoid losses of distillate by hold-up and/or evaporation, the difference method was regarded as superior.

The heteropoly blue method by Boltz and Mellon (Boltz, D. F. and Mellon, M. G., *Anal. Chem.*, 19,873 (1947)) modified by use of boric acid to complex fluoride was used for the determination of silica and phosphate in the aqueous hydrofluoric acid distillate.

In Table IV are tabulated the experimental results obtained from these batch laboratory tests. Results from experiments not tabulated were rejected from consideration for a variety of reasons; for example, ineffecient agitation, system priming or boil-over, and too high solids content in underflow. Columns 2 through 6 contain the primary variables which influenced the distillate composition. Yield and underflow solids content are shown in columns 11 through 16 respectively. The analyses of the residue components are indicated by columns 7 through 10, while the ratios of $HF/P_2O_5$ and $HF/SiO_2$ in the distillate are tabulated in columns 17 and 18 respectively.

Ci and R were calculated in accordance with the definition presented above. Exemplary of such calculation are the calculations conducted for Example 10.

$$Ci = \frac{\text{Amount of sulfuric acid + phosphoric acid available in grams}}{\text{liquid phase in grams}}$$

-continued $$= \frac{\text{sulfuric acid added + phosphoric acid from salts} - \text{sulfuric acid for reaction with Ca}}{\text{feed solids + water added + sulfuric acid added} - \text{calcium sulfate percipitated} - CO_2 \text{ evolved}}$$

$$= \frac{0.968 \times 228.6 + 14.66 - 70.86}{75 + 149.7 + 228.6 - 98.34 - 2.88} = \frac{165.08}{351.98}$$

$$= 46.9\%$$

This calculation does not consider the amount of $H_2SO_4$ which reacts with reactive metal cations in the feed material other than calcium and does not consider the sulfuric acid contributed by the $SO_4$ in the feed material. These amounts are negligible.

$$R = \frac{Ci}{HFi} = \frac{46.9\%}{\frac{9.38 \times 100}{351.98}} = 8.5$$

Using the primary variables R, Ci and Cf and Equations 2-5, predicted values for the distillate composition, yield, and underflow solids content were computed. The predicted distillate composition appears to be generally biased high, except in Example 23 where the experimental value is low. The agreement however, does indicate that the distillate composition can be predicted with some certainty for a variety of conditions. Closely tied with the distillate composition is the overhead yield of hydrogen fluoride. The deviation between the predicted and experimental yields are somewhat random and exhibit no certain bias. Outside of a few instances, the deviations are less than two percentage points. The predicted percentage of solids in the underflow is biased high by a few points. This indicates that slightly less solids are formed than are predicted from the feed material calcium content.

The model, from which Equations 2 through 5 originated, assumes a total dissolution of the fluoride contained in feed material. Analysis of the dry, washed calcium sulfate residue showed HF contents ranging from 0.5 to 2.0% HF (column 7). This is not surprising, for the feed material normally contains significant quantities of aluminum, iron, magnesium, etc., which all form insoluble fluoride species. The undissolved fluoride is likely due to acid insoluble aluminum and iron fluorides. This lack of fluoride dissolution is nearly compensated by the lower than expected fluoride concentration remaining in the underflow liquid phase. Columns 8 and 9 show the predicted and observed concentrations. In every case the experimental HF content of the liquid is several times less than that predicted. This is probably due to small errors associated with the adaption of the LeGassie and Termini data to the present system. The distillate composition is more susceptible to the undissolved fluoride since it is based strictly on the solubilized fluoride.

The effects of reduced pressure on the digester operation are illustrated by Examples 14–17 and 20–23. A decrease in operational temperature appears to be the only significant difference. There is no evidence suggesting an increase or decrease in either distillate composition or yield. More important, however, is the fact that digester operation under vacuum decreases the operational temperature by 50° to 90° C. without affecting the equilibrium properties of the system.

At atmospheric pressure, the observed final temperature in the batch tests corresponded very closely (within a few degrees) with the standard boiling point of a sulfuric acid solution of composition Cf. This was not the case for the reduced pressure tests where the observed temperature was generally lower than that predicted for an analogous sulfuric acid solution at the same pressure.

Special runs (not shown) were conducted to obtain temperature-time and temperature-distillate composition plots. From these curves it was estimated that about 30 to 45 minutes of retention would be necessary for a continuous reactor.

Distillate ratios of $HF/P_2O_5$ are tabulated in column 17 of Table IV. Column 18 of Table IV shows the ratio of $HF/SiO_2$ in the distillate. The ratio is remarkably constant and represents about 40% transfer of silica in the feed to distillate. This silica is removed from the system in the final rectification zones.

The dry, washed underflow solid typically analyzed 97.5% $CaSO_4$, 0.02% $AL_2O_3$, 0.02% $Fe_2O_3$, 0.3% MgO and 0.7% F. An IR examination using a KBr disk medium showed no indication of hemihydrate or dihydrate calcium sulfate but only trace quantities of free water. Repeated equilibrium with water did not alter the crystalline structure of the calcium sulfate. This material can have commodity value based on its form and purity.

Recovery of the free sulfuric-phosphoric acid mixture by filtration was easily accomplished.

12.8% HF. This represents an overhead yield of about 13% of the fluoride initially contained in the fluoride solids. The digester residue contained about 56% by weight solids and the free liquid contained about 25% $H_2SO_4+H_3PO_4$ (Cf=25%). Because R, Ci, and Cf were at the extreme bottom limits of the permissible range, the digestion was only marginally satisfactory, with the digester residue slurry containing about 56% solids.

EXAMPLE 25

In an experiment similar to Example 24, 1975 grams of a fluoride solid slurry containing 100 grams of the fluoride solid were mixed with 469 grams of 97% $H_2SO_4$ (R=15, Ci=20). The temperature was increased to 240° C. which rendered an average distillate containing by weight 1.7% HF, 0.2% $SiO_2$, and 100 ppm $P_2O_5$ ($HF:P_2O_5$=170:1). A 99% recovery of the fluoride was accomplished. The acid residue contained 90% $H_2SO_4+H_3PO_4$ (Cf=90%). Because R was at the extreme high end of the permissible range, and Ci was the extreme low end of the permissible range, operation of the digester was unsatisfactory, with the distillate containing only 1.7% by weight HF.

EXAMPLE 26

In an experiment similar to Example 25, a dry fluo-

TABLE IV
BATCH DIGESTION DATA

| (1) | (2) | (3) | (4) | (5) | (6) | (7) | (8) | (9) | (10) | (11) | (12) | (13) | (14) | (15) | (16) | (17) | (18) |
|---|---|---|---|---|---|---|---|---|---|---|---|---|---|---|---|---|---|
| | | | | | | | | Liquid[6] | | Distillate | | | | Underflow | | | |
| | | | | Abs. | Final | Solid[a] | Pred. | Obs. | | Obs. | Pred. | Yield | | Solids | | Distillate | |
| Ex. | R[a] | Ci % | Cf % | Press. in Hq | Temp °C. | HF, % | HF, % | HF, % | $H_2O$, % | HF, % | HF, % | Obs. % | Pred. % | Obs. % | Pred. % | HF/ $P_2O_5$ | HF/ $SiO_2$ |
| 1 | 10.84 | 53.86 | 72.03 | 29.9 | 180 | 1.0 | 1.05 | 0.21 | — | 14.8 | 17.3 | 92.2 | 88.1 | 23.6 | 25.2 | — | — |
| 2 | 6.83 | 45.05 | 76.62 | 29.9 | 175 | — | — | — | — | 12.8 | — | — | — | — | — | — | — |
| 3 | 7.96 | 53.07 | 75.09 | 29.9 | 180 | 1.0 | 1.12 | 0.28 | — | 18.7 | 20.9 | 92.3 | 92.0 | 29.9 | 32.4 | — | — |
| 4 | 7.99 | 53.13 | — | 29.9 | 183 | 1.0 | — | 0.30 | — | 17.6 | — | 92.0 | — | — | — | — | — |
| 5 | 6.17 | 54.06 | — | 29.9 | 177 | 2.0 | — | 0.31 | — | 23.4 | — | 88.0 | — | — | — | — | — |
| 6 | 6.15 | 53.99 | — | 29.9 | 157 | 2.0 | — | 0.44 | — | 25.6 | — | 86.4 | — | — | — | — | — |
| 7 | 7.99 | 53.11 | 75.33 | 29.9 | 157 | 0.68 | 1.10 | 0.34 | — | 19.7 | 20.8 | 92.9 | 92.1 | 29.2 | 32.4 | — | — |
| 8 | 9.09 | 52.15 | 75.18 | 29.9 | 176 | 1.29 | 0.92 | 0.31 | — | 15.7 | 17.3 | 89.5 | 92.5 | 29.6 | 29.6 | — | — |
| 9 | 8.74 | 42.18 | 77.33 | 29.9 | 185 | 0.50 | 0.51 | 0.16 | — | 9.5* | 10.2 | 95.6 | 96.5 | 30.3 | 31.0 | — | — |
| 10 | 8.50 | 46.90 | 78.11 | 29.9 | 186 | 0.87 | 0.67 | 0.20 | — | 12.7 | 14.0 | 93.6 | 95.7 | 31.0 | 32.5 | — | 28.2 |
| 11 | 8.26 | 47.02 | 78.60 | 29.9 | 187 | 0.95 | 0.64 | 0.22 | — | 12.6 | 13.6 | 93.0 | 96.0 | 31.0 | 32.6 | — | 26.8 |
| 12 | 8.26 | 47.38 | 78.33 | 29.9 | 189 | 0.85 | 0.66 | 0.21 | — | 13.1 | 13.9 | 93.4 | 95.8 | 31.1 | 32.5 | 3346 | — |
| 13 | 8.26 | 47.39 | 79.31 | 29.9 | 192 | 0.67 | 0.63 | 0.17 | — | 13.1 | 13.7 | 94.8 | 96.2 | 31.3 | 32.8 | 4903 | 24.3 |
| 14 | 8.28 | 47.49 | 86.35 | 10.0 | 151 | 0.59 | 0.44 | 0.15 | 16.25 | 11.7 | 12.5 | 95.4 | 98.1 | 34.3 | 35.4 | 1093 | 28.6 |
| 15 | 8.29 | 47.43 | 84.46 | 7.9 | 146 | 0.72 | 0.48 | 0.17 | 18.10 | 11.0 | 12.8 | 94.7 | 97.7 | 35.3 | 34.9 | — | — |
| 16 | 8.28 | 47.48 | 80.84 | 3.4 | 121 | 1.07 | 0.58 | 0.17 | 24.24 | 11.8 | 13.4 | 92.5 | 96.8 | 33.2 | 34.0 | — | 27.4 |
| 17 | 9.96 | 57.03 | 81.27 | 3.9 | 132 | 0.86 | 0.76 | 0.14 | 21.03 | 16.5 | 18.2 | 92.9 | 94.9 | 29.4 | 30.0 | 18330 | 26.3 |
| 18 | 8.28 | 52.52 | 83.89 | 29.9 | — | 0.56 | 0.63 | 0.11 | 18.45 | 15.4 | 16.4 | 95.9 | 97.0 | 33.8 | 34.8 | 7900 | — |
| 19 | 5.90 | 47.49 | 85.04 | 29.9 | — | 0.85 | 0.66 | 0.20 | 15.36 | 16.1 | 17.8 | 94.2 | 97.9 | 41.7 | 43.1 | 5194 | — |
| 20 | 8.28 | 52.50 | 76.99 | 5.9 | 135 | 1.14 | 0.92 | 0.22 | 25.38 | 16.7 | 18.7 | 91.5 | 93.7 | 32.3 | 32.9 | — | — |
| 21 | 5.90 | 47.49 | 81.16 | 7.9 | 146 | 0.94 | 0.80 | 0.38 | 22.11 | 17.2 | 18.8 | 92.0 | 96.9 | 40.2 | 42.0 | 6880 | — |
| 22 | 8.28 | 52.49 | 80.79 | 7.9 | 145 | 0.57 | 0.74 | 0.10 | 21.69 | 16.3 | 17.3 | 95.9 | 95.8 | 33.0 | 33.9 | 19180 | — |
| 23 | 5.00 | 54.98 | 87.04 | 7.9 | 155 | 0.93 | 0.99 | 0.18 | 13.66 | 24.8 | 29.1 | 94.0 | 97.5 | 46.4 | 47.8 | — | 25.5 |

[a]Washed and dried at 105° C.
[b]Filtered
*Outside of desired range

EXAMPLE 24

One hundred and seventy-seven grams of a wet fluoride solids containing on a dry basis 24.5% F, 14.2% $P_2O_5$, 3.8% $CO_2$, 54.0% CaO, and other minor impurities normally found in cooling pond water and 77 grams of water were agitated in a Teflon flask fitted with a heating mantle and a condenser as described for Examples 1–23. To this mixture was added 107.3 grams of 97% $H_2SO_4$ (R=1, Ci=20). The reaction temperature was increased to 107° C. during which time about 26 grams of distillate were collected which analyzed ride solid is used which contains 4.8% F, 49.4% CaO, 20.0% $P_2O_5$, and other impurities normally found in cooling pond water. One hundred grams of the solid are slurried with 291 grams of water followed by 138 grams of 97% $H_2SO_4$ (R=15, Ci=20). The mixture is heated to 200° C. Distillate amounting to about 291 grams contains 99% of the fluoride initially contained in the solid. The free liquid phase of the residue contains 0.03% HF, 23.9% $P_2O_5$, 56.8% $H_2SO_4$, and 10.0% $H_2O$.

EXAMPLE 27

Five hundred grams of distillate obtained from the digestion of fluoride solids and containing about 13% HF were evaporated at a pressure of 100 mm Hg in Teflon-packed monel column to yield a residue which contained about 36% HF, 3% $SiO_2$, 100 ppm $P_2O_5$, and the balance water. The average distillate contained less than 1% HF. An equilibrium boiling point of about 62° C. was achieved.

EXAMPLE 28

An experiment similar to Example 27 was conducted except that the rectification was conducted at an atmospheric pressure of about 755 mm of Hg. Equilibrium boiling point was 111° to 112° C. The bottoms contained 36% HF, 3% $SiO_2$, 100 ppm $P_2O_5$, with the balance water. The distillate was essentially water containing 4% HF on the average.

CONTROL 1

A fluoride solution such as the azeotrope produced in Examples 27 and 28 is diluted with 98% $H_2SO_4$ in the ratio 100 parts fluoride solution to 44 parts sulfuric acid on a weight basis. This produces a final mixture containing 25.0% HF, 29.9% $H_2SO_4$ and the balance water and minor impurities. This solution is boiled at atmospheric pressure to 115° C. to yield a vapor phase containing about 50% HF plus some silicon fluoride impurities. At this temperature, the sulfuric acid contains about fifty percent of the fluoride.

This control shows that if insufficient sulfuric acid is added to the azeotrope to produce a mixture containing at least 40% $H_2SO_4$, a substantial portion of the HF is left in the sulfuric acid and the distillate has a low HF content.

EXAMPLE 29

An experiment similar to Example 28 is conducted except that the HF—$H_2SO_4$—$H_2O$ mixture contains 4.4% HF, 86.0% $H_2SO_4$, plus water and silicon impurities. Heating the mixture to 400° F. renders a vapor containing nearly 99% HF and silicon fluorides. About eighty percent of the fluoride is distilled from the sulfuric acid.

By comparison with Control 1, Example 29 shows that addition of sufficient sulfuric acid to an azeotropic mixture to yield a mixture having a high concentration of $H_2SO_4$ produces a vapor having a high HF concentration.

EXAMPLE 30

Conversion of wet fluoride solids to anhydrous hydrofluoric acid was demonstrated on a continuous pilot plant scale. Reference is made to Table V which contains a material balance of the various stages based on about a two pounds per hour anhydrous hydrofluoric acid production rate. The data resulted from at least seventy-five hours of operation. The process scheme is shown in FIG. 4.

Wet fluoride solids 51 from a stirred feed tank 72 via a pump 73 and concentrated sulfuric acid 52 (Ci=56, R=8) were introduced into the top of an upright cylindrical graphite-lined vessel 74 (25.7 cm IDX 61.5 cm) fitted with a graphite paddle agitator 75. The liner was shelled by 0.32 cm mild steel, lined with 0.48 cm lead, which was in turn cemented to a 3.1 cm graphite liner. The vessel's bottom was lined as was the side, but the top was a sheet of Inconel 825. Simultaneously 240° F. steam 53 was injected into the vessel tangential to the wall at the bottom. Supplemental heat to maintain 350±10° F. was added by asbestos covered chromel wire windings overlayed with asbestos on the outside of the vessel. It has been observed that maximum yield of HF is obtained when the temperature in the digester is maintained from 350° to 360° F. Temperatures were monitored by thermocouples. Weak hydrofluoric acid vapor 76 exited at the top of the vessel through an Inconel 825 pipe and was condensed in water-jacketed Karbate tubes 78 as a weak acid condensate 54. The condensate was collected in a tank 80. Volatile $CO_2$ 55 was vented to the air. The acid slurry volume of the vessel was maintained at 15.0 liters by a gravity overflow system which was protected against short-circuiting by a draft tube. The underflow solids 56 were essentially $CaSO_4$ containing minor levels of impurities. The liquid phase 57 contained essentially 71.4% $H_2SO_4$ and 4.2% $H_3PO_4$ (Cf=75.6%). Eighty-nine percent of the initial fluoride was collected as weak acid condensate 54.

The weak acid condensate 54, typically at ambient temperature, was continuously fed via a pump 82 from the tank 80 to a 7.6 cm I.D. Kynar lined column 84 packed with 178 cm of Kynar mesh. The inlet was 76 cm from the packing bottom. A Karbate pipe wrapped with chromel wire was used as a thermosyphon reboiler 86. Azeotropic hydrofluoric acid 59 was removed from the column bottom by a gravity overflow and collected in an azeotrope tank 86. At equilibrium under good operating conditions, the reboiler temperature was maintained at 234°±2° F.; while water distillate 58 from an overhead condenser 88 contained less than about 500 ppm HF. A reflux ratio of about 0.5 to 1.0 was employed.

The azeotropic hydrofluoric acid 59, typically at ambient temperature, passed by pump 90 from the azeotrope tank 86 and was mixed with concentrated sulfuric acid 60 in a 1 cm I.D. pipe 92 and was fed 61 cm from the bottom of a 244 cm Teflon mesh packed Teflon lined column 94 to 10 cm inside diameter. The feed mixture contained 74.3% $H_2SO_4$ on a HF free basis and 35.0% HF on a $H_2SO_4$ free basis. Live 240° F. steam 61 was added at the bottom of the column as an energy supplement and to assist in defluorination. A wire wound Karbate thermosyphon served as a reboiler 96. Spent sulfuric acid 62 at 290°±10° F. was removed from the reboiler 96 by a gravity overflow system. Anhydrous hydrofluoric acid 97 exiting the column was condensed in an overhead monel condenser 98 at 40° to 50° F., and one part of product 63 to about nine parts reflux 99 was collected. The water content of the reflux was continuously measured by conductivity. The volatiles 64 from the monel condenser 98 were water scrubbed in scrubber 100. Typical analysis of the anhydrous HF product was 0.007% $H_2O$, 0.0002% $H_2SiF_6$, 0.0005% $P_2O_5$, 0.007% nonvolatile as $H_2SO_4$ (includes $P_2O_5$), and 0.04% $SO_2$. The overall yield of fluoride from the wet solids to anhydrous hydrofluoric acid was typically 83% excluding recycle of fluoride values collected in vent scrubbers.

This Example demonstrates that, by the described process, a nearly complete separation of fluoride from phosphorus is achieved. The initial acidulation of the fluoride solids provided a HF/$P_2O_5$ weight ratio of 1270 in the weak acid condensate. This was improved to 200,000 in the sulfuric acid extractive distillation stage.

TABLE V a
MATERIAL BALANCE FOR EXAMPLE 30

| | 51 WET FLUORIDE SOLIDS | | 52 98% $H_2SO_4$ | | 53 STEAM | | 54 WEAK ACID CONDENSATE | | 55 VOLATILES | |
|---|---|---|---|---|---|---|---|---|---|---|
| | GM/H* | % | GM/H* | % | GM/H* | % | GM/H* | % | GM/H* | % |
| F | 1067.3 | 17.40 | | | | | 949.9 | 24.10 | | |
| $P_2O_5$ | 391.3 | 6.38 | | | | | 0.8 | 0.02 | | |
| $SiO_2$ | 207.5 | 3.38 | | | | | 51.2 | 1.30 | | |
| $Al_2O_3$ | 89.0 | 1.45 | | | | | | | | |
| $Fe_2O_3$ | 47.4 | 0.77 | | | | | | | | |
| MgO | 47.5 | 0.77 | | | | | | | | |
| CaO | 2022.0 | 32.96 | | | | | | | | |
| $SO_3$ | 106.7 | 1.74 | 9416.4 | 80.00 | | | 17.4 | 0.44 | | |
| $CO_2$ | 35.5 | 0.58 | | | | | | | 35.5 | 50.00 |
| $H_2O$ | 2453.7 | 40.00 | 2354.0 | 20.00 | 2564.3 | 100.00 | 2901.8 | 73.64 | 35.5 | 50.00 |
| OTHER | <333.8> | <5.44> | | | | | 19.6 | 0.50 | | |
| TOTAL | 6134.1 | 99.99 | 11770.4 | 100.00 | 2564.3 | 100.00 | 3940.7 | 100.00 | 71.00 | 100.00 |

| | 56 UNDERFLOW SOLIDS | | 57 UNDERFLOW LIQUID | |
|---|---|---|---|---|
| | GM/H* | % | GM/H* | % |
| P | 68.2 | 1.38 | 49.2 | 0.43 |
| $P_2O_5$ | 41.5 | 0.84 | 349.0 | 3.03 |
| $SiO_2$ | 7.0 | 0.14 | 149.3 | 1.30 |
| $Al_2O_3$ | 33.7 | 0.68 | 55.3 | 0.48 |
| $Fe_2O_3$ | 5.6 | 0.11 | 41.8 | 0.36 |
| MgO | 5.6 | 0.11 | 41.9 | 0.36 |
| CaO | 2018.4 | 40.85 | 3.6 | 0.03 |
| $SO_3$ | 2789.8 | 56.46 | 6715.9 | 58.32 |
| $CO_2$ | | | | |
| $H_2O$ | 0 | 0 | 4434.7 | 38.51 |
| OTHER | <28.8> | <0.58> | <324.6> | <2.82> |
| TOTAL | 4941.0 | 99.99 | 11516.1 | 100.00 |

*GRAMS PER HOUR

TABLE V b
MATERIAL BALANCE FOR EXAMPLE 30

| | 58 $H_2O$ DISTILLATE | | 59 AZEOTROPE | | 60 98% $H_2SO_4$ | | 61 STEAM | | 62 AHF | | 63 SPENT $H_2SO_4$ | | 64 VENT | |
|---|---|---|---|---|---|---|---|---|---|---|---|---|---|---|
| | gm/h* | % | gm/h* | % | gm/h* | % | gm/h* | % | gm/h* | % | gm/h* | % | gm/h* | % |
| F | 0.5 | 0.04 | 949.4 | 34.30 | | | | | 882.4 | 94.96 | 1.0 | 0.01 | 66.0 | 73.33 |
| $P_2O_5$ | | | 0.8 | 0.03 | | | | | <0.1 | | 0.8 | 0.01 | | |
| $SiO_2$ | | | 51.2 | 1.85 | | | | | <0.1 | | | | 51.2 | 56.89 |
| $Al_2O_3$ | | | | | | | | | | | | | | |
| $Fe_2O_3$ | | | | | | | | | | | | | | |
| MgO | | | | | | | | | | | | | | |
| CaO | | | | | | | | | | | | | | |
| $SO_3$ | | | 17.4 | 0.63 | 4363.4 | 80.00 | | | <0.1 | | 4380.8 | 55.58 | | |
| $CO_2$ | | | | | | | | | | | | | | |
| $H_2O$ | 1172.0 | 99.96 | 1729.8 | 62.49 | 1090.9 | 20.00 | 678.5 | 100.00 | <0.1 | | 3499.2 | 44.40 | | |
| OTHER | | | 19.6 | 0.71 | | | | | 46.8 | 5.04 | | | <27.2> | <30.22> |
| TOTAL | 1172.5 | 100.00 | 2768.2 | 100.01 | 5454.3 | 100.00 | 678.5 | 100.00 | 929.2 | 100.00 | 7881.8 | 100.00 | 90.0 | 100.00 |

*grams per hour

CONTROL 2

Five grams of dry fluoride solids containing 23.6% F and 15.5% $P_2O_5$ were weighed into a platinum dish containing a Teflon stir bar. To this were added 3.69 grams of 98% $H_2SO_4$ and the mixture was heated to about 250° C. on a magnetic stirrer hot plate for one hour. The residue weighed 6.95 grams and contained 6.28% F and 10.73% $P_2O_5$. The weight ratio of HF/$P_2O_5$ volatilized was 28.

This test demonstrates that a digestion zone operated according to the principles of this invention, as shown by Example 32, effects a separation from HF from $P_2O_5$ not effected by prior art methods, represented by this test, where fluoride solids are treated with sulfuric acid in a low humidity environment.

CONTROL 3

Ten grams of the same solids used in Control 2 were combined with 30.0 grams of 98% $H_2SO_4$ in a 125 ml glass filter flask. Suction was pulled on the flask through a series of five gas scrubbers containing about 1% NaOH in water. The flask was heated intensely on a hot plate until the reaction ceased. Analyses of the residue and the scrubber liquor indicated weight ratios of HF/$P_2O_5$ volatilized of 22 and 37 respectively. These are considerably smaller than the ratio typically required for anhydrous hydrofluoric acid (HF/Nonvolatile acid = 10,000) and serves to illustrate the necessity of the described process because prior art processes cannot effect a satisfactory separation of HF from $P_2O_5$ values.

EXAMPLE 31

Sediment collected from a phosphate operation cooling pond is water washed and dried at 105° C. Nineteen hundred and seventy seven grams of this material containing 25.0% F, 24.0% CaO, 8.1% $SO_3$, 2.1% $P_2O_5$, 6.3% $Al_2O_3$, 0.4% $Fe_2O_3$, 0.5% $Na_2O$, 16.9% total $SiO_2$, 11.7% sand $SiO_2$, and various other minor impurities are mixed with 2479 grams of water in a Teflon flask. To this mixture are added 5482 grams of 96% $H_2SO_4$ (R=8, $C_i$=45). The total active metal content (excluding sand $SiO_2$) is used to compute R and Ci rather than only CaO because of the significant contributions made by the silicon and aluminum in this material. The solution is boiled to a final temperature of 183° C. while the distillate is condensed and collected. The weak acid condensate contains 12.3% HF, 5.6% $SiO_2$, and the balance essentially water. Eight-eight percent of the fluoride present in the initial solids in collected as weak acid condensate. The flask residue contains 12% solids and the liquid phase contains 75% $H_2SO_4$ plus $H_3PO_4$ (Cf=75%).

EXAMPLE 32

An ambient temperature slurry containing 59.8% solids, the solids containing on a dry basis 29.62% F, 10.84% $P_2O_5$, and 0.43% $CO_2$, was metered at 92.2 grams per minute into the vessel described in Example 30. Simultaneously, 238.0 grams per minute of 98% $H_2SO_4$ at ambient temperature and 30.0 grams per minute of 240° F. steam were metered into the vessel which was maintained at 350° F. The nominal parameters for the test were R=10, Ci=66, Cf=77. The weak acid condensate contained 33.9% HF at a yield of 77%.

EXAMPLE 33

A weak acid condensate at 80° F. was made in a manner similar to that described in Example 30 but contained 22.0% HF, 0.89% $SiO_2$, 0.30% $P_2O_5$, 0.17% $SO_4$ and the balance essentially water. One thousand three hundred and sixty-four grams per hour of this solution were added together with 3469 grams per hour of 98% $H_2SO_4$ at 80° F. into the sulfuric acid column described in Example 30. Simultaneously 283 grams per hour of 240° F. steam were added at the bottom of the column 94 to aid in defluorination. The underflow contained 70.6% $H_2SO_4$, 0.01% $P_2O_5$, 0.009% $SiO_2$ and the balance essentially water. This stream was withdrawn at about 290° F. and at about 4816 grams per hour. Condensate at 40° to 50° F. was collected at about 300 grams per hour and analyzed 0.0022% $SiO_2$, 0.0005% $P_2O_5$, 0.038% $SO_2$, 0.0064% nonvolatile acidity as $H_2SO_4$, 0.007% $H_2O$ and the remainder essentially HF.

EXAMPLE 34

The same weak acid used in Example 33 was fed together with 1.95 times its weight of 98% $H_2SO_4$ to the column 94 under the same conditions except that no steam was added at the bottom of the column. The underflow at 285° F. contained 69.0% $H_2SO_4$, 1.2% HF, other minor impurities, and water. The hydrogen fluoride condensate had essentially the same analysis as illustrated in Example 33. Comparison of Examples 33 and 34 shows that introduction of steam to the extractive distillation column enhances yield.

The examples demonstrate that the process described herein can be used to produce a substantially phosphate-free anhydrous hydrofluoric acid from phosphate-contaminated metallic fluoride salts.

Although this invention has been described in considerable detail with regard to certain preferred versions, other versions are possible. Therefore, the spirit and scope of the appended claims should not be limited to these preferred versions.

What is claimed is:

1. A method for recovering hydrogen fluoride substantially free of phosphate values, reported by analysis as $P_2O_5$, from a metallic fluoride salt mixture comprising metallic cations reactive with sulfuric acid, at least about 7% by weight, on a dry basis, fluorine and analyzing to contain from about 4% to about 25% by weight, on a dry basis, $P_2O_5$, comprising the steps of:
    (a) introducing such metallic fluoride salt mixture to a digestion zone;
    (b) introducing to the digestion zone water and sulfuric acid and maintaining the digestion zone at an elevated temperature sufficiently high to produce a distillate comprising hydrogen fluoride substantially free of phosphate values from the metallic fluoride salt mixture in the digestion zone and leave a slurry for removal from the digestion zone, the slurry comprising a residual liquid including introduced water and introduced sulfuric acid and residual solids resulting from reaction of sulfuric acid with the reactive metallic cations of the metallic fluoride salt mixture and wherein sufficient water and sufficient sulfuric acid are introduced to the digestion zone such that Ci is from about 20 to about 70, R is from about 1 to about 15, and Cf is from about 25 to about 90, wherein:
    Ci = the amount of sulfuric acid and phosphoric acid theoretically present in the digestion zone, after introduction of the sulfuric acid and water to the digestion zone, in excess of the amount of sulfuric acid required for reaction with the reactive metallic cations in the digestion zone, where Ci is in units of percent by weight in the liquid phase;
    R = Ci/HFi, where HFi = the theoretical concentration of hydrogen fluoride in the liquid in the digestion zone, after introduction of the sulfuric acid and water to the digestion zone, in units of percent by weight in the liquid in the digestion zone;
    Cf = the actual concentration of sulfuric acid and phosphoric acid in the residual liquid in units of percent by weight in the residual liquid;
    (c) withdrawing produced distillate from the digestion zone; and
    (d) removing slurry from the digestion zone.

2. The method of claim 1 in which R is from about 6 to about 10.

3. The method of claim 1 in which Ci is from about 40 to about 55.

4. The method of claim 1 in which Cf is from about 75 to about 85.

5. The method of claim 1 in which distillate withdrawn from the digestion zone has a weight ratio of hydrogen fluoride to $P_2O_5$ of at least 1000:1.

6. The method of claim 1 in which at least 60% of the fluorine in the metallic fluoride salts introduced to the digestion zone is in the distillate withdrawn from the digestion zone.

7. The method of claim 1 in which at least 80% of the fluorine in the metallic fluoride salt mixture introduced to the digestion zone is in the distillate withdrawn from the digestion zone.

8. The method of claim 1 in which the distillate withdrawn from the digestion zone comprises at least 10% by weight hydrogen fluoride.

9. The method of claim 1 in which the distillate withdrawn from the digestion zone comprises at least 20% by weight hydrogen fluoride.

10. The method of claim 1 in which the slurry removed from the digestion zone has a solids content of less than about 45% by weight.

11. The method of claim 1 in which R is from about 6 to about 10, Ci is from about 40 to about 55, and Cf is from about 75 to about 85.

12. The method of claim 1 in which the distillate comprising hydrogen fluoride substantially free of phosphate values has a weight ratio of hydrogen fluoride to $P_2O_5$ of greater than 100.

13. In a method for recovering hydrogen fluoride containing phosphate values, reported by analysis as $P_2O_5$, from a metallic fluoride salt mixture comprising at least about 7% by weight, on a dry basis, fluorine and analyzing to contain from about 4% to about 25% by weight, on a dry basis, $P_2O_5$, the method comprising the steps of:

introducing such metallic fluoride salt mixture and sulfuric acid in an amount in excess of that required for reaction with the metallic fluoride salt mixture into a digestion stage maintained at an elevated temperature sufficient for reaction therein of the metallic fluoride salt mixture with sulfuric acid and reacting the sulfuric acid with the metallic fluoride salt mixture to release a gas comprising hydrogen fluoride and phosphate values and produce a slurry comprising a residual liquid including introduced unreacted sulfuric acid and residual solids resulting from reaction of the metallic fluoride salt mixture with sulfuric acid; and withdrawing the released gas and slurry from the digestion zone, the improvement comprising the steps of:

introducing water to the digestion zone; and maintaining the concentration of water and sufficient excess unreacted sulfuric acid in the digestion zone such that the released gas comprising hydrogen fluoride withdrawn from the digestion zone is substantially free of phosphate values and has a weight ratio of hydrogen fluoride to $P_2O_5$ of greater than 100.

14. The method of claim 13 in which sufficient water and sulfuric acid are introduced to the digestion zone such that at least 60% of the fluorine in the metallic fluoride salt mixture introduced into the digestion zone is in the released gas withdrawn from the digestion zone.

15. The method of claim 13 in which sufficient water and sulfuric acid are introduced to the digestion zone such that the released gas withdrawn from the digestion zone has a hydrogen fluoride concentration of at least 10% by weight.

16. The method of claim 13 in which sufficient water and sulfuric acid are introduced to the digestion zone such that the released gas withdrawn from the digestion zone has a hydrogen fluoride concentration of from about 20% to about 30% by weight.

17. The method of claim 13 in which the concentration of water and sulfuric acid in the digestion zone are maintained such that the slurry removed from the digestion zone has a solids content of less than 45% by weight.

18. The method of claim 13 in which the metallic fluoride salt mixture comprise fluoride containing materials precipitated from a waste stream of a wet process phosphoric acid facility.

19. In the method for recovering hydrogen fluoride containing phosphate values, reported by analysis as $P_2O_5$, from a metallic fluoride salt mixture comprising metallic cations reactive with sulfuric acid, at least about 7% by weight, on a dry basis, fluorine and analyzing to contain from about 4% to about 25% by weight, on a dry basis, $P_2O_5$, the method comprising the steps of:

introducing such metallic fluoride salt mixture and sulfuric acid to a digestion zone maintained at a temperature sufficiently high for the sulfuric acid to react with the metallic fluoride salt mixture to produce a distillate comprising hydrogen fluoride and phosphate values and a slurry comprising a residual liquid including sulfuric acid and residual solids resulting from reaction of the metallic fluoride salt mixture with sulfuric acid; and withdrawing the distillate and slurry from the digestion zone, the improvement comprising the steps of:

introducing water to the digestion zone and maintaining the concentration of water and sulfuric acid in the digestion zone at a level such that the distillate comprising hydrogen fluoride and phosphate values withdrawn from the digestion zone is substantially free of phosphate values and has a weight ratio of hydrogen fluoride to $P_2O_5$ of greater than 100 and such that Ci is from about 20 to about 70, R is from about 1 to about 15 and Cf is from about 25 to about 90, wherein:

Ci = the amount of sulfuric acid and phosphoric acid theoretically present in the digestion zone, after introduction of the sulfuric acid and water to the digestion zone, in excess of the amount of sulfuric acid required for reaction with the reactive metallic cations in the digestion zone, where Ci is in units of percent by weight in the liquid phase;

R = Ci/HFi, where HFi = the theoretical concentration of hydrogen fluoride in the liquid in the digestion zone, after introduction of the sulfuric acid and water to the digestion zone, in units of percent by weight in the liquid in the digestion zone; and Cf = the actual concentration of sulfuric acid and phosphoric acid in the residual liquid in units of percent by weight in the residual liquid.

20. The method of claim 19 including the steps of:

(a) rectifying withdrawn distillate in a first rectification zone to produce a substantially azeotropic mixture of water and hydrogen fluoride, the azeotropic mixture containing phosphate values;

(b) introducing the azeotropic mixture to a second rectification zone for rectification of the azeotropic mixture therein to produce a vapor stream enriched with hydrogen fluoride;

(c) withdrawing the vapor steam enriched with hydrogen fluoride from the second rectification zone; and (d) introducing sufficient sulfuric acid to the second rectification zone such that the vapor stream withdrawn from the second rectification zone comprises at least 80% HF and has a hydrogen fluoride to $P_2O_5$ weight ratio of greater than 10,000:1.

21. The method of claim 20 including the step of further rectifying the vapor stream withdrawn from the second rectification zone to at least about 99% by weight hydrogen fluoride.

22. The method of claim 20 in which sufficient sulfuric acid is introduced to the second rectification zone to yield in combination with the azeotropic mixture introduced to the second rectification zone a solution comprising from about 40 to about 90% by weight sulfuric acid on a hydrogen fluoride free basis.

23. The method of claim 20 including the step of introducing steam to the second rectification zone.

24. The method of claim 20 in which the azeotropic mixture contains silicon values.

25. The method of claim 19 including the steps of:
 (a) introducing the withdrawn distillate to a rectification zone for rectification of the distillate therein to produce a vapor stream enriched with hydrogen fluoride;
 (b) withdrawing the vapor stream enriched with hydrogen fluoride from the rectification zone; and
 (c) introducing sufficient sulfuric acid to the rectification zone such that the vapor stream withdrawn from the second rectification stage comprises at least 80% HF and such overhead has a hydrogen fluoride to $P_2O_5$ weight ratio of greater than 10,000:1.

26. The method of claim 25 including the step of further rectifying the vapor stream withdrawn from the rectification zone to at least about 99% by weight hydrogen fluoride.

27. The method of claim 25 in which sufficient sulfuric acid is introduced to the rectification zone to yield in combination with the distillate introduced to the rectification zone a solution comprising from about 40 to about 90% by weight sulfuric acid on a hydrogen fluoride free basis.

28. The method of claim 25 including the step of introducing steam to the rectification zone.

29. A method for producing substantially anhydrous hydrogen fluoride having a hydrogen fluoride to $P_2O_5$ weight ratio greater than 10,000 from a feed mixture comprising phosphate values analyzed as $P_2O_5$ and, on a dry basis, from about 10 to about 35% by weight hydrogen fluoride, where the weight ratio of hydrogen fluoride to phosphate values as $P_2O_5$ in the feed mixture is from about 100:1 to less than 10,000:1, the remainder of the feed mixture comprising substantially water, the method comprising the steps of:
 (a) rectifying the feed mixture in a first rectification zone to produce a substantially azeotropic mixture of water and hydrogen fluoride, the azeotropic mixture containing the phosphate values;
 (b) introducing the azeotropic mixture to a second rectification zone for rectification of the azeotropic mixture therein to produce a vapor stream enriched with hydrogen fluoride;
 (c) withdrawing the vapor stream enriched with hydrogen fluoride from the second rectification zone; and
 (d) introducing sufficient sulfuric acid to the second rectification zone such that the vapor stream withdrawn from the second rectification zone comprises at least 80% HF and has a hydrogen fluoride to $P_2O_5$ weight ratio of greater than 10,000:1.

30. The method of claim 29 including the step of further rectifying the vapor stream withdrawn from the second rectification zone to at least about 99% by weight hydrogen fluoride.

31. The method of claim 29 in which sufficient sulfuric acid is introduced to the second rectification zone to yield in combination with the azeotropic mixture introduced to the second rectification zone a solution comprising from about 40 to about 90% by weight sulfuric acid on a hydrogen fluoride free basis.

32. A method for producing substantially anhydrous hydrogen fluoride having a hydrogen fluoride to $P_2O_5$ weight ratio greater than 10,000 from a feed mixture comprising phosphate values analyzed as $P_2O_5$ and from about 20 to about 35% by weight hydrogen fluoride, where the weight ratio of hydrogen fluoride to $P_2O_5$ in the feed mixture is from about 100:1 to less than 10,000:1, the remainder of the feed mixture comprising substantially water, the method comprising the steps of:
 (a) introducing the feed mixture to a rectification zone for rectification of the feed mixture therein to produce a vapor stream enriched with hydrogen fluoride;
 (b) withdrawing the vapor stream enriched with hydrogen fluoride from the rectification zone; and
 (c) introducing sufficient sulfuric acid to the rectification zone such that the vapor stream withdrawn from the rectification zone comprises at least 80% HF and has a hydrogen fluoride to $P_2O_5$ weight ratio of greater than 10,000:1.

33. The method of claim 32 including the step of further rectifying the vapor stream withdrawn from the rectification zone to at least about 99% by weight hydrogen fluoride.

34. The method of claim 29 in which sufficient sulfuric acid is introduced to the rectification zone to yield, in combination with the vapor mixture introduced to the rectification zone, a solution comprising from about 40 to about 90% by weight sulfuric acid on a hydrogen fluoride free basis.

35. The method of claim 32 including the step of introducing steam to the rectification zone.

36. A method for recovering substantially anhydrous hydrogen fluoride having a hydrogen fluoride to $P_2O_5$ weight ratio greater than 10,000 from a metallic fluoride salt mixture comprising metallic cations reactive with sulfuric acid, at least about 7% by weight, on a dry basis, fluorine and from about 4% to about 25% by weight phosphate values as $P_2O_5$, on a dry basis analysis, comprising the steps of:
 (a) introducing such metallic fluoride salt mixture to a digestion zone;
 (b) introducing to the digestion zone water and sulfuric acid and maintaining the digestion zone at an elevated temperature for release of a gas comprising hydrogen fluoride and phosphate values from the metallic fluoride salt mixture in the digestion zone, thereby leaving a slurry for removal from the digestion zone, the slurry comprising a residual liquid including introduced water and introduced sulfuric acid and residual solids resulting from reaction of sulfuric acid with the metallic fluoride salt mixture, wherein sufficient water and sufficient sulfuric acid are introduced to the digestion zone such that Ci is from about 20 to about 70, R is from about 1 to about 15, and Cf is from about 25 to about 90, where
 Ci=the amount of sulfuric acid and phosphoric acid theoretically present in the digestion zone, after introduction of the sulfuric acid and water to the digestion zone, in excess of the amount of sulfuric acid required for reaction with the reactive metallic cations in the digestion zone, where Ci is in units of percent by weight in the liquid phase;

R=Ci/HFi, where HFi=the theoretical concentration of hydrogen fluoride in the liquid in the digestion zone, after introduction of the sulfuric acid and water to the digestion zone, in units of percent by weight in the liquid in the digestion zone; and Cf=the actual concentration of sulfuric acid and phosphoric acid in the residual liquid in units of percent by weight in the residual liquid;

(c) withdrawing released gas from the digestion zone;

(d) removing slurry from the digestion zone;

(e) introducing withdrawn released gas to a rectification zone for rectification of the gas therein to produce a vapor stream enriched with hydrogen fluoride;

(f) introducing sufficient sulfuric acid to the rectification zone such that the vapor stream withdrawn from the rectification zone comprises at least 80% HF and has a hydrogen fluoride to $P_2O_5$ weight ratio of greater than 10,000:1; and (g) withdrawing the vapor stream enriched with hydrogen fluoride from the rectification zone.

37. The method of claim 36 including the step of further rectifying the vapor stream withdrawn from the rectification zone to at least about 99% by weight hydrogen fluoride.

38. The method of claim 36 in which sufficient sulfuric acid is introduced to the rectification zone to yield in combination with the withdrawn released gas introduced to the rectification zone a solution comprising from about 40 to about 90% by weight sulfuric acid on a hydrogen fluoride free basis.

39. The method of claim 36 in which R is from about 6 to about 10.

40. The method of claim 36 in which Ci is from about 40 to about 55.

41. The method of claim 36 in which Cf is from about 75 to about 85.

42. The method of claim 36 including the step of introducing steam to the rectification zone.

43. The method of claim 36 in which the withdrawn released gas from the digestion zone is first introduced to an azeotropic rectification zone to form a substantially azeotropic mixture containing phosphate values, and the azeotropic mixture is then introduced to the rectification zone into which sulfuric acid is introduced.

44. The method of claim 36 in which at least 60% of the fluorine in the metallic salts fluoride mixture introduced to the digestion zone is in the distillate withdrawn from the digestion zone.

45. The method of claim 36 in which the distillate withdrawn from the digestion zone comprises at least 10% by weight hydrogen fluoride.

46. The method of claim 36 in which the distillate withdrawn from the digestion zone comprises at least 20% by weight hydrogen fluoride.

47. A method for recovering hydrogen fluoride substantially free of phosphate values reported by analysis as $P_2O_5$ from a metallic fluoride salt mixture comprising metallic cations reactive with sulfuric acid, and at least about 7% by weight, on a dry basis, fluorine and analyzing to contain from about 4% to about 25% by weight, on a dry basis, $P_2O_5$, comprising the steps of:

(a) introducing such metallic fluoride salt mixture to a digestion zone;

(b) introducing to the digestion zone water and sulfuric acid and maintaining the digestion zone at an elevated temperature sufficiently high to release a gas comprising hydrogen fluoride substantially free of phosphate values from the metallic fluoride salt mixture in the digestion zone and leave a slurry for removal from the digestion zone, the slurry comprising a residual liquid including introduced water and introduced sulfuric acid and residual solids resulting from reaction of sulfuric acid with the metallic fluoride salt mixture;

(c) withdrawing released gas from the digestion zone;

(d) removing slurry from the digestion zone;

wherein the quantity of water and sulfuric acid introduced to the digestion zone are selected to substantially satisfy the equations:

$$HF_v = \frac{KCi}{((K-1)J+1)R} \geq 10\%$$

$$Y = \frac{100JK}{(K-1)J+1} \geq 60\%$$

and $$US = \frac{1}{\frac{RW}{CF} + \frac{1}{100}} \leq 50\%$$

where

J=1−Ci/Cf $HF_v$=the concentration of HF in the released gas withdrawn from the digestion zone in % by weight;

Y=the percent by weight of the fluorine in the metallic fluoride salts introduced to the digestion zone in the released gas withdrawn from the digestion zone;

US=the solids contents of the slurry, % by weight;

K=0.095565e (0.075435Cf);

W=with respect to the metallic fluoride salts introduced to the digestion zone, the mass ratio of fluorine represented as HF to calcium oxide represented as $CaSO_4$;

Ci=the amount of sulfuric acid and phosphoric acid theoretically present in the digestion zone, after introduction of the sulfuric acid and water to the digestion, zone in excess of the amount of sulfuric acid required for reaction with the reactive metallic cations in the digestion zone, where Ci is in units of percent by weight in the liquid phase;

R=Ci/HFi, where HFi=the theoretical concentration of hydrogen fluoride in the liquid in the digestion zone, after introduction of the sulfuric acid and water to the digestion zone, in units of percent by weight in the liquid in the digestion zone; and Cf=the actual concentration of sulfuric acid and phosphoric acid in the residual liquid in units of percent by weight in the residual liquid.

48. The method of claim 47 in which Ci is from about 20 to about 70, R is from about 1 to about 15, and Cf is from about 25 to about 90.

49. The method of claim 48 in which R is from about 6 to about 10.

50. The method of claim 48 in which Ci is from about 40 to about 55.

51. The method of claim 48 in which Cf is from about 75 to about 85.

52. The method of claim 47 in which R is from about 6 to about 10, Ci is from about 40 to about 55, and Cf is from about 75 to about 85.

53. The method of claim 47 in which distillate withdrawn from the digestion zone has a weight ratio of hydrogen fluoride to $P_2O_5$ of at least 1000:1.

54. In a method for recovering hydrogen fluoride containing phosphate values reported by analysis as $P_2O_5$ from a metallic fluoride salt mixture contained in the waste stream of a wet process phosphoric acid facility and comprising metallic cations reactive with sulfuric acid wherein the metallic fluoride salts comprise at least about 7% by weight, on a dry basis, fluorine and analyzing to contain from about 4% to about 25% by weight, on a dry basis, $P_2O_5$, the method comprising the steps of:

introducing such metallic fluoride salt mixture and sulfuric acid to a digestion zone maintained at a sufficiently high temperature for production therein of a distillate comprising hydrogen fluoride and phosphate values and the production of a slurry comprising a residual liquid including introduced sulfuric acid and residual solids resulting from reaction of the metallic fluoride salt mixture with sulfuric acid; and withdrawing the distillate and slurry from the digestion zone, the improvement comprising the steps of:

introducing water to the digestion zone; and maintaining the concentration of water and sufficient sulfuric acid in the digestion zone at a level such that the distillate comprising hydrogen fluoride withdrawn from the digestion zone is substantially free of phosphate values and has a weight ratio of hydrogen fluoride to $P_2O_5$ of greater than 100 and such that Ci is from about 20 to about 70, R is from about 1 to about 15, and Cf is from about 25 to about 90, where Ci = the amount of sulfuric acid and phosphoric acid theoretically present in the digestion zone, after introduction of the sulfuric acid and water to the digestion zone, in excess of the amount of sulfuric acid required for reaction with the reactive metallic cations in the digestion zone, where Ci is in units of percent by weight in the liquid phase;

R = Ci/HFi, where HFi = the theoretical concentration of hydrogen fluoride in the liquid in the digestion zone, after introduction of the sulfuric acid and water to the digestion zone, in units of percent by weight in the liquid in the digestion zone; and Cf = the actual concentration of sulfuric acid and phosphoric acid in the residual liquid in units of percent by weight in the residual liquid.

* * * * *